(12) United States Patent
Srinivasan et al.

(10) Patent No.: US 9,858,241 B2
(45) Date of Patent: *Jan. 2, 2018

(54) SYSTEM AND METHOD FOR SUPPORTING OPTIMIZED BUFFER UTILIZATION FOR PACKET PROCESSING IN A NETWORKING DEVICE

(71) Applicant: Oracle International Corporation, Redwood Shores, CA (US)

(72) Inventors: Arvind Srinivasan, San Jose, CA (US); Ajoy Siddabathuni, Santa Clara, CA (US); Elisa Rodrigues, Union City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 14/072,597

(22) Filed: Nov. 5, 2013

(65) Prior Publication Data

US 2015/0127762 A1    May 7, 2015

(51) Int. Cl.
*G06F 15/16* (2006.01)
*G06F 15/173* (2006.01)
(Continued)

(52) U.S. Cl.
CPC ...... *G06F 15/17331* (2013.01); *G06F 9/5016* (2013.01); *H04L 29/08009* (2013.01); *G06F 2209/5018* (2013.01)

(58) Field of Classification Search
CPC .. G06F 15/17331; G06F 15/173; G06F 13/28; G06F 9/5016; G06F 2209/5018;
(Continued)

(56) References Cited

U.S. PATENT DOCUMENTS 5,717,952 A * 2/1998 Christiansen et al. .......... 710/22
6,041,053 A   3/2000 Douceur et al.
(Continued)

FOREIGN PATENT DOCUMENTS

| GB | 2367728 | 4/2002 |
|---|---|---|
| WO | 2005057318 | 6/2005 |
| WO | 2008093174 | 8/2008 |

OTHER PUBLICATIONS

WO00/51004: Inventor Stracovsky, Henry, Title: Methods and Apparatus for Facilitating Direct Memory Access, Pub. Date:Aug. 31, 2000.*

(Continued)

*Primary Examiner* — David Lazaro
*Assistant Examiner* — Berhanu Shitayewoldetsad
(74) *Attorney, Agent, or Firm* — Tucker Ellis LLP

(57) ABSTRACT

A system and method can support efficient packet processing in a network environment. The system can comprise a direct memory access (DMA) resources pool that comprises one or more of DMA resources. Furthermore, the system can use a plurality of packet buffers in a memory, wherein each said DMA resource can point to a chain of packet buffers in the memory. Here, the chain of packet buffers can be implemented based on either a linked list data structure and/or a linear array data structure. Additionally, each said DMA resource allows a packet processing thread to access the chain of packet buffers using a pre-assigned thread key.

20 Claims, 10 Drawing Sheets

(51) Int. Cl.
  *H04L 29/08* (2006.01)
  *G06F 9/50* (2006.01)
(58) Field of Classification Search
  CPC . H04L 67/1097; H04L 49/90; H04L 67/2842;
    H04L 47/193; H04L 47/56; H04L 67/10;
    H04L 67/1095; H04L 29/08549; H04L
    47/2441; H04L 47/624; H04L 47/6295;
    H04L 47/70; H04L 65/4084; H04L 67/34;
    H04L 29/08009
  USPC ............... 709/212, 227, 242, 232, 225, 224
  See application file for complete search history.

(56) References Cited

U.S. PATENT DOCUMENTS

| | | | |
|---|---|---|---|
| 6,058,460 A | 5/2000 | Nakhimovsky | |
| 6,070,219 A | 5/2000 | McAlpine et al. | |
| 6,131,163 A | 10/2000 | Wiegel | |
| 6,163,539 A | 12/2000 | Alexander et al. | |
| 6,269,401 B1 | 7/2001 | Fletcher et al. | |
| 6,477,643 B1 | 11/2002 | Vorbach et al. | |
| 6,594,775 B1 | 7/2003 | Fair | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,771,595 B1 | 8/2004 | Gilbert et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 6,985,937 B1 | 1/2006 | Keshav et al. | |
| 7,046,665 B1 | 5/2006 | Walrand et al. | |
| 7,111,303 B2 | 9/2006 | Macchiano et al. | |
| 7,120,152 B2 | 10/2006 | Park | |
| 7,146,431 B2 | 12/2006 | Hipp et al. | |
| 7,177,311 B1 | 2/2007 | Hussain et al. | |
| 7,200,704 B2 | 4/2007 | Njoku et al. | |
| 7,260,102 B2 | 8/2007 | Mehrvar et al. | |
| 7,313,142 B2 | 12/2007 | Matsuo et al. | |
| 7,450,498 B2 | 11/2008 | Golia et al. | |
| 7,480,302 B2 | 1/2009 | Choi | |
| 7,502,884 B1 | 3/2009 | Shah et al. | |
| 7,561,531 B2 | 7/2009 | Lewites et al. | |
| 7,613,132 B2 | 11/2009 | Tripathi et al. | |
| 7,620,955 B1 | 11/2009 | Nelson | |
| 7,633,955 B1 | 12/2009 | Saraiya et al. | |
| 7,688,838 B1 | 3/2010 | Aloni et al. | |
| 7,694,298 B2 | 4/2010 | Goud et al. | |
| 7,730,205 B2 | 6/2010 | Rothman et al. | |
| 7,730,486 B2 | 6/2010 | Herington | |
| 7,761,617 B2 | 7/2010 | Seigneret et al. | |
| 7,782,868 B2 | 8/2010 | Hsieh et al. | |
| 7,827,598 B2 | 11/2010 | Moran et al. | |
| 7,865,781 B2 | 1/2011 | Fox et al. | |
| 7,877,524 B1* | 1/2011 | Annem et al. | 710/26 |
| 7,885,257 B2 | 2/2011 | Droux et al. | |
| 8,031,709 B2 | 10/2011 | Alexander, Jr. | |
| 8,073,990 B1* | 12/2011 | Baron et al. | 710/22 |
| 8,295,275 B2 | 10/2012 | Mann | |
| 8,358,651 B1 | 1/2013 | Kadosh et al. | |
| 8,370,530 B2 | 2/2013 | Tripathi et al. | |
| 8,396,514 B2* | 3/2013 | Adams | 455/566 |
| 8,848,412 B1 | 9/2014 | Yeung et al. | |
| 2002/0013861 A1* | 1/2002 | Adiletta et al. | 709/313 |
| 2002/0052972 A1 | 5/2002 | Yim | |
| 2002/0080721 A1 | 6/2002 | Tobagi et al. | |
| 2003/0037154 A1 | 2/2003 | Poggio et al. | |
| 2003/0041216 A1* | 2/2003 | Rosenbluth et al. | 711/141 |
| 2003/0120772 A1 | 6/2003 | Husain et al. | |
| 2003/0140196 A1* | 7/2003 | Wolrich et al. | 711/118 |
| 2004/0015966 A1 | 1/2004 | MacChiano et al. | |
| 2004/0130961 A1* | 7/2004 | Kuo et al. | 365/230.03 |
| 2004/0151170 A1* | 8/2004 | Gulati | H04L 49/9089 |
| | | | 370/360 |
| 2004/0199808 A1 | 10/2004 | Freimuth et al. | |
| 2004/0202182 A1 | 10/2004 | Lund et al. | |
| 2004/0210623 A1 | 10/2004 | Hydrie et al. | |
| 2004/0267866 A1 | 12/2004 | Carollo et al. | |
| 2005/0018601 A1* | 1/2005 | Kalkunte | H04L 12/5601 |
| | | | 370/229 |
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2005/0182853 A1 | 8/2005 | Lewites et al. | |
| 2005/0251802 A1 | 11/2005 | Bozek et al. | |
| 2006/0041667 A1 | 2/2006 | Ahn et al. | |
| 2006/0045088 A1 | 3/2006 | Nguyen | |
| 2006/0045089 A1 | 3/2006 | Bacher et al. | |
| 2006/0045109 A1* | 3/2006 | Blackmore et al. | 370/402 |
| 2006/0070066 A1 | 3/2006 | Grobman | |
| 2006/0092928 A1 | 5/2006 | Pike et al. | |
| 2006/0174324 A1 | 8/2006 | Zur et al. | |
| 2006/0206300 A1 | 9/2006 | Garg et al. | |
| 2006/0206602 A1 | 9/2006 | Hunter et al. | |
| 2006/0218556 A1* | 9/2006 | Nemirovsky | G06F 9/3851 |
| | | | 718/104 |
| 2006/0233168 A1 | 10/2006 | Lewites et al. | |
| 2006/0236063 A1 | 10/2006 | Hausauer et al. | |
| 2006/0248229 A1 | 11/2006 | Saunderson et al. | |
| 2006/0253619 A1 | 11/2006 | Torudbakken et al. | |
| 2007/0019646 A1 | 1/2007 | Bryant et al. | |
| 2007/0047536 A1 | 3/2007 | Scherer et al. | |
| 2007/0078988 A1 | 4/2007 | Miloushev et al. | |
| 2007/0083723 A1 | 4/2007 | Dey et al. | |
| 2007/0101323 A1 | 5/2007 | Foley et al. | |
| 2007/0183418 A1 | 8/2007 | Riddoch et al. | |
| 2007/0244937 A1 | 10/2007 | Flynn et al. | |
| 2007/0244972 A1 | 10/2007 | Fan | |
| 2007/0288720 A1* | 12/2007 | Cholleti et al. | 711/202 |
| 2008/0002683 A1 | 1/2008 | Droux et al. | |
| 2008/0005748 A1 | 1/2008 | Mathew et al. | |
| 2008/0019365 A1 | 1/2008 | Tripathi et al. | |
| 2008/0022016 A1 | 1/2008 | Tripathi et al. | |
| 2008/0043765 A1 | 2/2008 | Belgaied et al. | |
| 2008/0144635 A1 | 6/2008 | Carollo et al. | |
| 2008/0171550 A1 | 7/2008 | Zhao | |
| 2008/0192648 A1 | 8/2008 | Galles | |
| 2008/0222734 A1* | 9/2008 | Redlich et al. | 726/26 |
| 2008/0225853 A1 | 9/2008 | Melman et al. | |
| 2008/0225875 A1 | 9/2008 | Wray et al. | |
| 2008/0235755 A1* | 9/2008 | Blaisdell et al. | 726/1 |
| 2008/0239945 A1 | 10/2008 | Gregg | |
| 2008/0253379 A1 | 10/2008 | Sasagawa | |
| 2008/0270599 A1 | 10/2008 | Tamir et al. | |
| 2009/0006593 A1 | 1/2009 | Cortes | |
| 2009/0125752 A1 | 5/2009 | Chan et al. | |
| 2009/0150576 A1 | 6/2009 | Madruga et al. | |
| 2009/0150883 A1 | 6/2009 | Tripathi et al. | |
| 2009/0187679 A1* | 7/2009 | Puri | G06F 13/28 |
| | | | 710/22 |
| 2009/0193216 A1* | 7/2009 | Melvin | H04L 49/90 |
| | | | 711/166 |
| 2009/0265299 A1* | 10/2009 | Hadad et al. | 706/55 |
| 2009/0328073 A1 | 12/2009 | Tripathi | |
| 2010/0046531 A1 | 2/2010 | Louati et al. | |
| 2010/0332698 A1 | 12/2010 | Muller | |
| 2011/0019574 A1 | 1/2011 | Malomsoky et al. | |
| 2011/0080830 A1 | 4/2011 | Ko et al. | |
| 2011/0149966 A1* | 6/2011 | Pope et al. | 370/392 |
| 2011/0154031 A1* | 6/2011 | Banerjee | G06F 21/335 |
| | | | 713/165 |
| 2011/0161580 A1 | 6/2011 | Shah et al. | |
| 2011/0161619 A1 | 6/2011 | Kaminski et al. | |
| 2012/0017265 A1 | 1/2012 | Twitchell, Jr. | |
| 2012/0044948 A1 | 2/2012 | Nachum et al. | |
| 2012/0207158 A1 | 8/2012 | Srinivasan et al. | |
| 2012/0246448 A1 | 9/2012 | Abdallah | |
| 2012/0311597 A1* | 12/2012 | Manula | G06F 9/5077 |
| | | | 718/104 |
| 2013/0268700 A1* | 10/2013 | Fuhs | G06F 13/28 |
| | | | 710/22 |

(56) References Cited

U.S. PATENT DOCUMENTS

2015/0007187 A1   1/2015  Shows
2015/0127762 A1*  5/2015  Srinivasan et al. ........... 709/212

OTHER PUBLICATIONS

European Patent Office, International Searching Authority, International Search Report and Written Opinion dated Mar. 16, 2015 for International Application No. PCT/US2014/059749, 13 pages.
International Report on Patentability issued in PCT/US2012/020746 dated Aug. 29, 2013, 7 pages.
International Search Report and Written Opinion for PCT/US2012/020746 dated Mar. 13, 2012, 9 pages.
Trapeze, Trapeze Overview, Jan. 1, 1998, USENIX, retrieved from the Internet, <usenix.org/publications/library/proceedings/usenix98/full_papers/anderson/anderson_html/node4.html>, 2 pages.
Goldenberg, D. et al., Zero Copy Sockets Direct Protocol over InfiniBand—Preliminary Implementation and Performance Analysis, Proceedings of the 13th Symposium on High Performance Interconnects, Piscataway, NJ, Aug. 17-19, 2005, pp. 128-137, 10 pages.
I/O Virtualization Using Mellanox InfiniBand and Channel I/O Virtualization (CIOV) Technology, XP-002541674, 2007, retrieved from the Internet, <http://www.mellanox.com/pdf/whitepapers/WP_Virtualize_with_IB.pdf>, pp. 1-16, 16 pages.
InfiniBand Software Stack, XP-002541744, Jan. 1, 2006, retrieved from the Internet, <http://download.microsoft.com/download/c/3/1/c318044c-95e8-4df9-a6af-81cdcb3c53c5/Mellanox%20Technologies%20-%20Infiniband%20Software%20Stack%20-%20WinIB%20-%20external.PDF>, pp. 1-2, 2 pages.
Wheeler, B., 10 Gigabit Ethernet in Servers: Benefits and Challenges, XP-002541745, Jan. 2005, retrieved from the Internet, <http://www.hp.com/products1/serverconnectivity/adapters/ethernet/10gbe/infolibrary/10GbE_White_Paper.pdf>, 8 pages.
Windows Platform Design Notes: Winsock Direct and Protocol Offload on SANs, XP-002541746, Mar. 3, 2001, retrieved from the Internet, <http://download.microsoft.com/download/1/6/1/161ba512-40e2-4cc9-843a-923143f3456c/WinsockDirect-ProtocolOffload.doc>, 8 pages.
International Search Report from PCT/US2009/048594 dated Sep. 7, 2009, 4 pages.
Written Opinion from PCT/US2009/048594 dated Sep. 7, 2009, 1 page.
Tripathi, S., Crossbow Architectural Document, Nov. 21, 2006, 19 pages.
Nordmark, E., IP Instances—Network Isolation Meets Zones, presented at SVOSUG, Oct. 26, 2006, 28 pages.
Tripathi, S., CrossBow: Network Virtualization and Resource Control, presented at SVOSUG, Aug. 24, 2006, 27 pages.
Tripathi, S., CrossBow: Network Virtualization and Resource Control, presented at Sun Labs Open House, Jun. 1, 2006, 24 pages.
Office Action from the United States Patent and Trademark Office for U.S. Appl. No. 11/953,829, dated Aug. 4, 2010, 30 pages.
Office Action from the United States Patent and Trademark Office for U.S. Appl. No. 11/953,837, dated Jun. 11, 2010, 27 pages.
Office Action from the United States Patent and Trademark Office for U.S. Appl. No. 11/953,839, dated Aug. 19, 2010, 30 pages.
Office Action from the United States Patent and Trademark Office for U.S. Appl. No. 12/040,165, dated Feb. 8, 2010, 40 pages.
Notice of Allowance from the United States Patent and Trademark Office for U.S. Appl. No. 12/040,165, dated Oct. 29, 2010, 18 pages.
Office Action from the United States Patent and Trademark Office for U.S. Appl. No. 12/040,101, dated May 6, 2010, 39 pages.
Office Action from the United States Patent and Trademark Office for U.S. Appl. No. 11/953,842, dated Apr. 30, 2010, 39 pages.

Final Office Action from the United States Patent and Trademark Office for U.S. Appl. No. 11/953,842, dated Oct. 15, 2010, 32 pages.
Office Action from the United States Patent and Trademark Office for U.S. Appl. No. 12/040,105, dated Nov. 20, 2009, 93 pages.
Final Office Action from the United States Patent and Trademark Office for U.S. Appl. No. 12/040,105, dated May 26, 2010, 26 pages.
Notice of Allowance from the United States Patent and Trademark Office for U.S. Appl. No. 12/040,105, dated Oct. 5, 2010, 27 pages.
Office Action from the United States Patent and Trademark Office for U.S. Appl. No. 11/953,843, dated May 3, 2010, 169 pages.
Final Office Action from the United States Patent and Trademark Office for U.S. Appl. No. 11/953,843, dated Oct. 15, 2010, 33 pages.
Office Action from the United States Patent and Trademark Office for U.S. Appl. No. 12/053,666, dated Dec. 10, 2009, 36 pages.
Final Office Action from the United States Patent and Trademark Office for U.S. Appl. No. 12/053,666, dated Jun. 11, 2010, 27 pages.
Notice of Allowance from the United States Patent and Trademark Office for U.S. Appl. No. 12/053,666, dated Oct. 7, 2010, 15 pages.
Office Action from the United States Patent and Trademark Office for U.S. Appl. No. 12/053,676, dated Dec. 9, 2009, 41 pages.
Notice of Allowance from the United States Patent and Trademark Office for U.S. Appl. No. 12/053,676, dated Jul. 15, 2010, 20 pages.
Final Office Action from the United States Patent and Trademark Office for U.S. Appl. No. 12/040,101, dated Dec. 13, 2010, 25 pages.
Kumar, R., ASI and PCI Express: Complementary Solutions, Dec. 2004, RTC magazine, retrieved from the Internet, <rtcmagazine.com/articles/view/100274>, 5 pages.
Martinez, R. et al., Providing Quality of Service Over Advanced Switching, 2006, IEEE, retrieved from the Internet, <ieeexplore.ieee.org/xpls/abs all.jsp?arnumber=1655667&tag=1>, 10 pages.
Apani, Brave New World, Feb. 1, 2007, iSmile, retrieved from the Internet, <ismile.com/PDFs/Apani_Segmentation_WP.pdf>, 8 pages.
OpenSolaris, Popuri, OpenSolaris Virtualization Technologies, Feb. 23, 2007, retrieved from the Internet, <hub.opensolaris.org/bin/view/Community+Group+advocacy/techdays%2Darchive%2D06%2D07>, 2 pages.
International Search Report dated Aug. 19, 2009, 3 pages.
International Preliminary Report on Patentability issued in PCT/US2009/035405, dated Sep. 10, 2010, 9 pages.
Dovrolis, C. et al., HIP: Hybrid Interrupt—Polling for the Network Interface: ACM SIGOPS Operating Systems Review, vol. 35, Iss. 4, Oct. 2001, 11 pages.
Tripathi, S., Solaris Networking—The Magic Revealed (Part I), Sunay Tripathi's Solaris Networking Weblog, Nov. 14, 2005, pp. 1-22, 22 pages.
Tripathi, S., CrossBow: Solaris Network Virtualization and Resource Control, Crossbow Architectural Document, Nov. 21, 2006, 19 pages.
Nordmark, E. et al., IP Instances Interface Document, PSARC 2006/366, Dec. 28, 2006, 17 pages.
Nordmark, E., IP Instances Design Document, PSARC 2006/366, Dec. 21, 2006, 38 pages.
Tripathi, S., CrossBow: Solaris Network Virtualization & Resource Control, CrossBow Overview Document, Aug. 23, 2006, 12 pages.
Nordmark, E., IP Instances—Network Isolation Meets Zones, presented at the SVOSUG meeting, Oct. 26, 2006, 28 pages.
Tripathi, S., CrossBow: Network Virtualization and Resource Control, presented at the SVOSUG meeting, Aug. 24, 2006, 28 pages.
Tripathi, S., Crossbow: ReCap, presented at an internal Sun Labs Open House presentation on Jun. 1, 2006, made public Aug. 2006, 23 pages.
European Patent Office, Examining Division, Substantive Examination Report dated Mar. 24, 2017 for International Application No. 14816457.7, 5 Pages.

* cited by examiner

SYSTEM AND METHOD FOR SUPPORTING OPTIMIZED BUFFER UTILIZATION FOR PACKET PROCESSING IN A NETWORKING DEVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, each of which is hereby incorporated by reference in its entirety:

U.S. Patent Application titled "SYSTEM AND METHOD FOR SUPPORTING EFFICIENT PACKET PROCESSING MODEL IN A NETWORK ENVIRONMENT", application Ser. No. 14/072,566, filed Nov. 5, 2013; and U.S. Patent Application titled "SYSTEM AND METHOD FOR SUPPORTING VIRTUALIZED SWITCH CLASSIFICATION TABLES", application Ser. No. 14/072,658, filed Nov. 5, 2013.

FIELD OF INVENTION

The present invention is generally related to computer systems, and is particularly related to an engineered system for middleware and application execution.

BACKGROUND

As larger cloud computing architectures are introduced, the performance and administrative bottlenecks associated with the traditional network and storage have become a significant problem. An engineered system, such as the Oracle engineered system, can provide excellent processing speeds, significantly faster deployments, instant visuals for in-depth analysis, and manageable big data capability. This is the general area that embodiments of the invention are intended to address.

SUMMARY

Described herein are systems and methods that can support efficient packet processing in a network environment. The system can comprise a direct memory access (DMA) resources pool that comprises one or more of DMA resources. Furthermore, the system can use a plurality of packet buffers in a memory, wherein each said DMA resource can point to a chain of packet buffers in the memory. Here, the chain of packet buffers can be implemented based on either a linked list data structure and/or a linear array data structure. Additionally, each said DMA resource allows a packet processing thread to access the chain of packet buffers using a pre-assigned thread key.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the InfiniBand (IB) network switch as an example for a high performance networking device. It will be apparent to those skilled in the art that other types of high performance networking devices can be used without limitation.

Described herein are systems and methods that can support multi-threaded direct memory access (DMA) processing in a network environment. In accordance with an embodiment of the invention, the system allows the DMA processing to be flexible and with low memory footprint.

High Performance Networking Device

Figure 1:
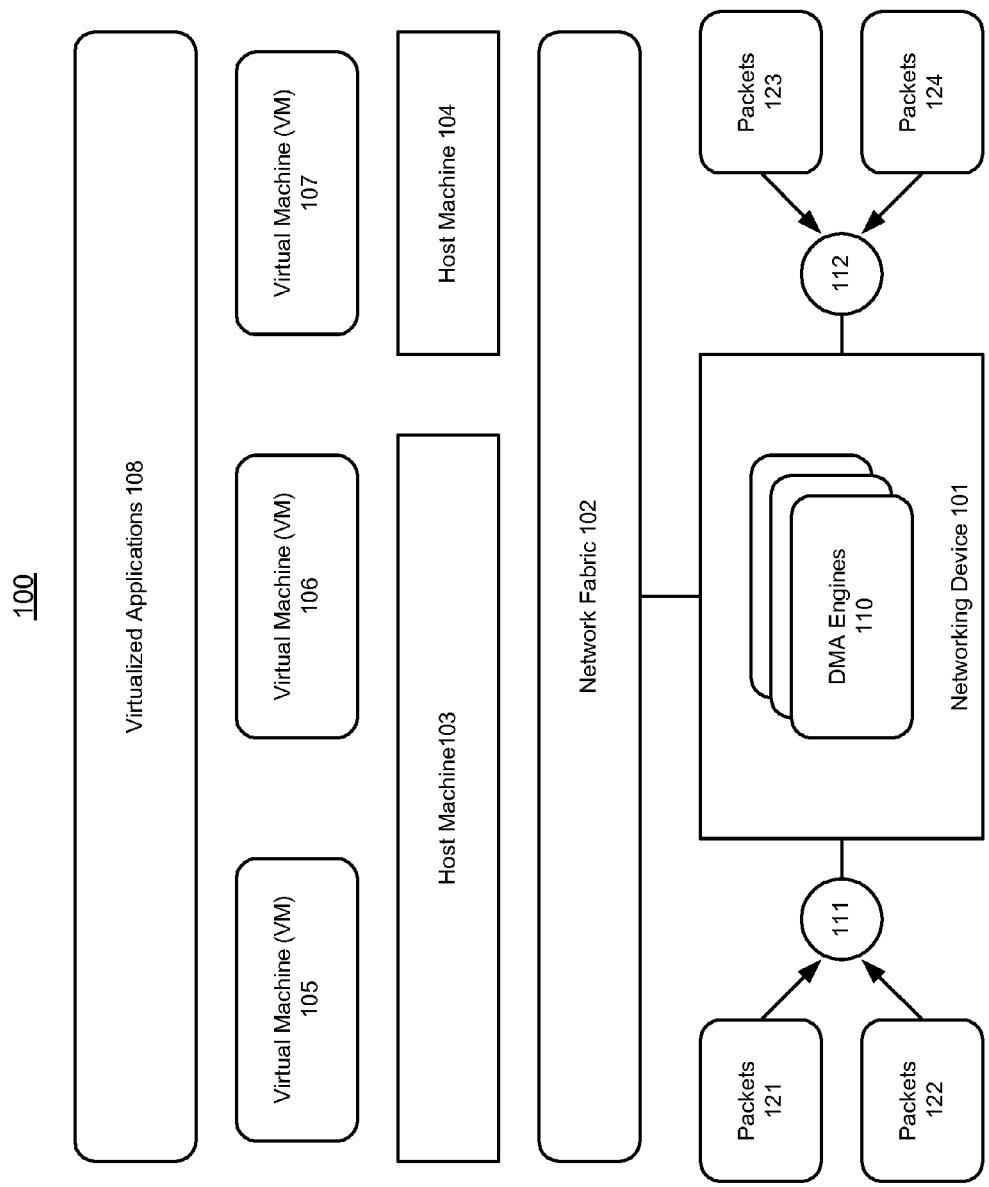
FIG. 1 shows an illustration of supporting a high performance networking device in a network environment, in accordance with an embodiment of the invention.

FIG. 1 shows an illustration of supporting a high performance networking device in a network environment, in accordance with an embodiment of the invention. As shown in FIG. 1, a high performance networking device 101, such as a network switch, can be used in a network fabric 102 to direct packet flows in a network environment 100.

In accordance with an embodiment of the invention, embedded processors, e.g. DMA engines 110, can be used in the networking device 101 for processing packets, such as the packets 121-124 (e.g. including both control packets and data packets). Here, the transmission and reception of these packets 121-124 can occur at the network ports 111-112 of the networking device 101.

As shown in FIG. 1, the networking device 101 can support a virtualized fabric. The system allows virtualized applications 108 to run on one or more virtual machines (VMs) 105-107 that are supported using one or more host machines 103-104.

Furthermore, when a networking device 101 supports a virtualized fabric, the throughput requirements for processing the control packets 121-124 may vary accordingly to the requirement of the different virtualized applications 108. As shown in FIG. 1, the network fabric 102 can use the networking device 101 to direct multiple packet streams from various hosts 103-104/VMs 105-107.

In order to support the virtualized applications 108, these different control packet streams, from various VMs 105-107, can be mapped to hardware resources in the networking device 101 for packet processing. In accordance with an embodiment of the invention, the embedded processors, such as the DMA engines 110, can perform different types of packet processing and can run a large number of software threads (or work queues).

Unlike the DMA engines that run on traditional network interface cards (NICs), which can have substantial CPU capability and system memory, the embedded systems may have limited CPU capability and system memory. Thus, mapping software threads to the hardware resources in the embedded systems may incur significant software performance penalties. For example, these performance penalties can appear in the form of software thread locking overheads, packet buffer management, and other forms, which can further reduce the available CPU capability.

In accordance with an embodiment of the invention, the system can provide a framework for supporting an efficient packet processing model in the network environment 100. This framework can map a large number of software threads to a limited set of hardware DMA processing threads without locking and thread contentions. Additionally, the system can optimize the buffer utilization for packet processing in the networking device 101.

Packet Processing Model

Figure 2:
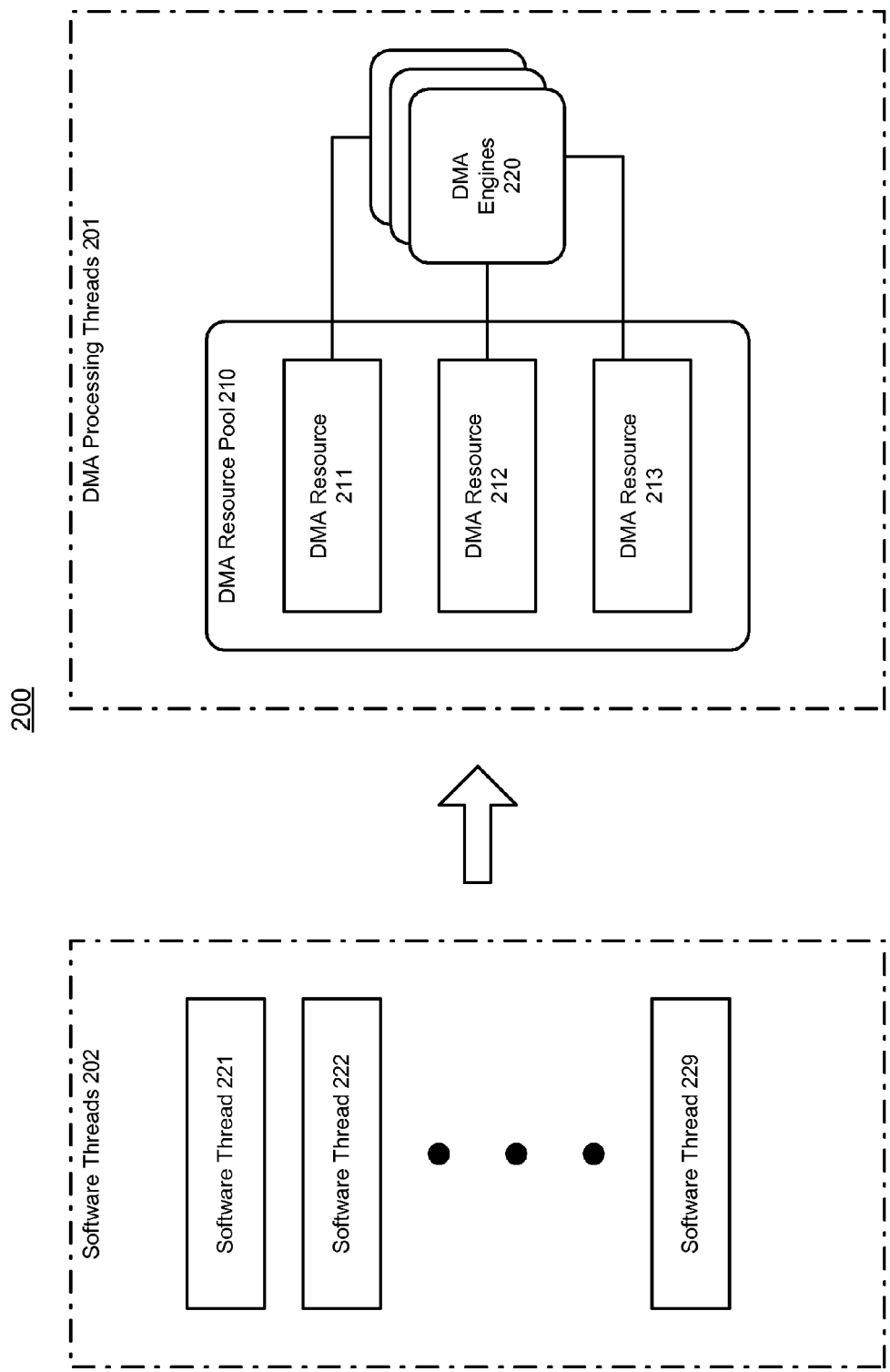
FIG. 2 shows an illustration of supporting an efficient packet processing model in a networking device, in accordance with an embodiment of the invention.

FIG. 2 shows an illustration of supporting efficient packet processing in a networking device, in accordance with an embodiment of the invention. As shown in FIG. 2, the hardware can provide a free DMA resources pool 210, which contains one or more DMA resources 211-213.

In accordance with an embodiment of the invention, the DMA resources 211-213 can represent DMA descriptors, buffer management and DMA engines used for data movement. For example, the DMA resources 211-213 can be tied to one or more DMA engines 220 that represent the physical medium, on which packet transfers can occur.

As shown in FIG. 2, the system can provide an efficient packet processing model 200, which can map a large number of software threads 202 to a limited set of hardware DMA processing threads 201. The DMA resources 211-213 can be allocated, on-demand, for various software threads 221-229 as needed. Also, the DMA resources 211-213 can be dynamically relinquished by the software threads 221-229.

For example, the DMA resources 211-213 can be assigned according to the data rate that each DMA Engine can sustain. Here, the assignment of the DMA resources 211-213 may not depend on the number of software threads working on a given DMA engine. This is because the traffic processing may be spread among multiple software threads, and each of these software threads may be active only for the duration of the work processing time.

Figure 3:
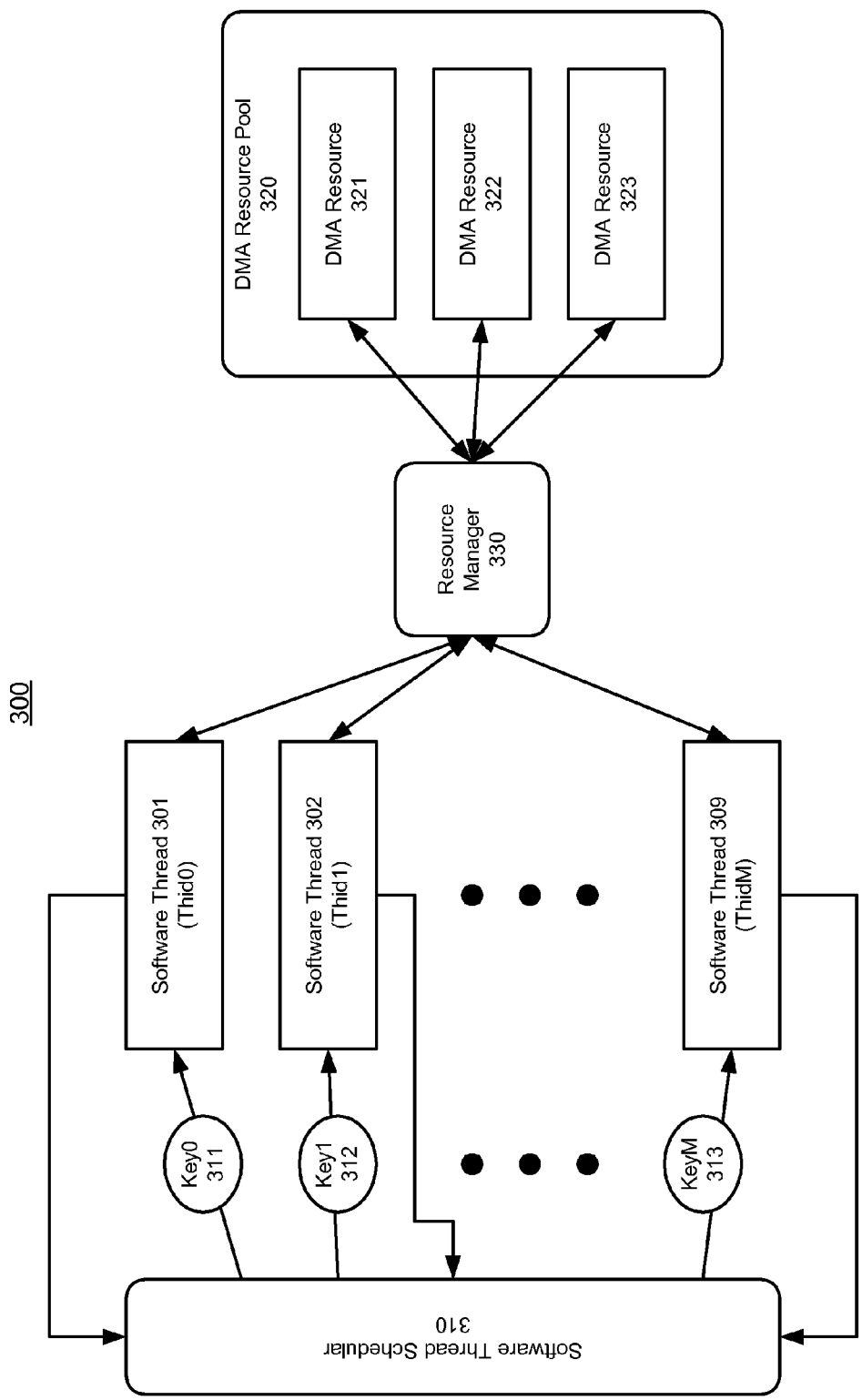
FIG. 3 shows an illustration of supporting a packet processing model in a networking device, in accordance with an embodiment of the invention.

FIG. 3 shows an illustration of supporting an efficient packet processing model in a networking device, in accordance with an embodiment of the invention. As shown in FIG. 3, a thread scheduling engine, such as a thread scheduler 310, can be used to assign a different thread key (e.g. key0 311 to key9 319) to each of the software threads 301-309 in a networking device 300. Here, the thread scheduler 310 can be built based on a standard real time O/S or a customized O/S.

In accordance with an embodiment of the invention, when a software thread requires performing network data transfer, the software thread can request for accessing a DMA resource by presenting the DMA resource with the assigned thread key. As shown in FIG. 3, each software threads 301-309 can present a thread key to a resource manager 330, which is used to allocate DMA resources for the different software threads 301-309.

For example, the software thread 301 with a thread ID Thid0 can use the assigned thread key, key0 311, to allocate a DMA resource from the DMA resource pool 320. Also, the software thread 302 with a thread ID Thid1 can use the assigned thread key, key1 312, to allocate a DMA resource from the DMA resource pool 320. Likewise, the software thread 309 with a thread ID Thid9 can use the assigned thread key, key9 319, to allocate a DMA resource from the DMA resource pool 320.

If any DMA resource in the DMA resource pool 320 is free, the available DMA resource can be assigned to the requesting software thread. For example, the assigned DMA resource can be mapped to the assigned thread key associated with the requesting software thread. On the other hand, if the DMA resource has already been assigned to another software thread, the requesting software thread may be prevented (or denied) from accessing the DMA resource. Additionally, the system can set the appropriate status for the requesting software thread. Furthermore, if all the DMA resources are in use, then the requesting software thread may have to wait until a DMA resource in the DMA resource pool 320 is free.

In accordance with an embodiment of the invention, using the assigned thread key, the requesting software thread can further configure the DMA resource as it needs, after the resource has been assigned to the software thread. For example, the requesting software thread can set the descriptor properties (e.g. using a linked list instead of a ring structure).

Additionally, a single software thread can make a request for multiple DMA resources if needed. The system can assign multiple DMA resources 321-323 available in the free pool 320 to the requesting software thread based on the same assigned thread key. Furthermore, the software thread can decide whether it wants to maintain ordering between the multiple assigned resources once these DMA resources 321-323 are assigned. For example, the software thread can provide a dependency list to the hardware if ordering is required.

In accordance with an embodiment of the invention, the system allows multiple threads to concurrently access the DMA resources 321-323 (including the packet buffers). By allowing each thread to have a different thread key, the system can send and receive packets from the network fabric without a need for implementing mutex locks or semaphores.

In accordance with an embodiment of the invention, the thread key space can be configured to include a large number of entries in order to support a large number of possible software threads. Thus, the system can map a large number of software threads to a limited set of hardware resources.

Figure 4:
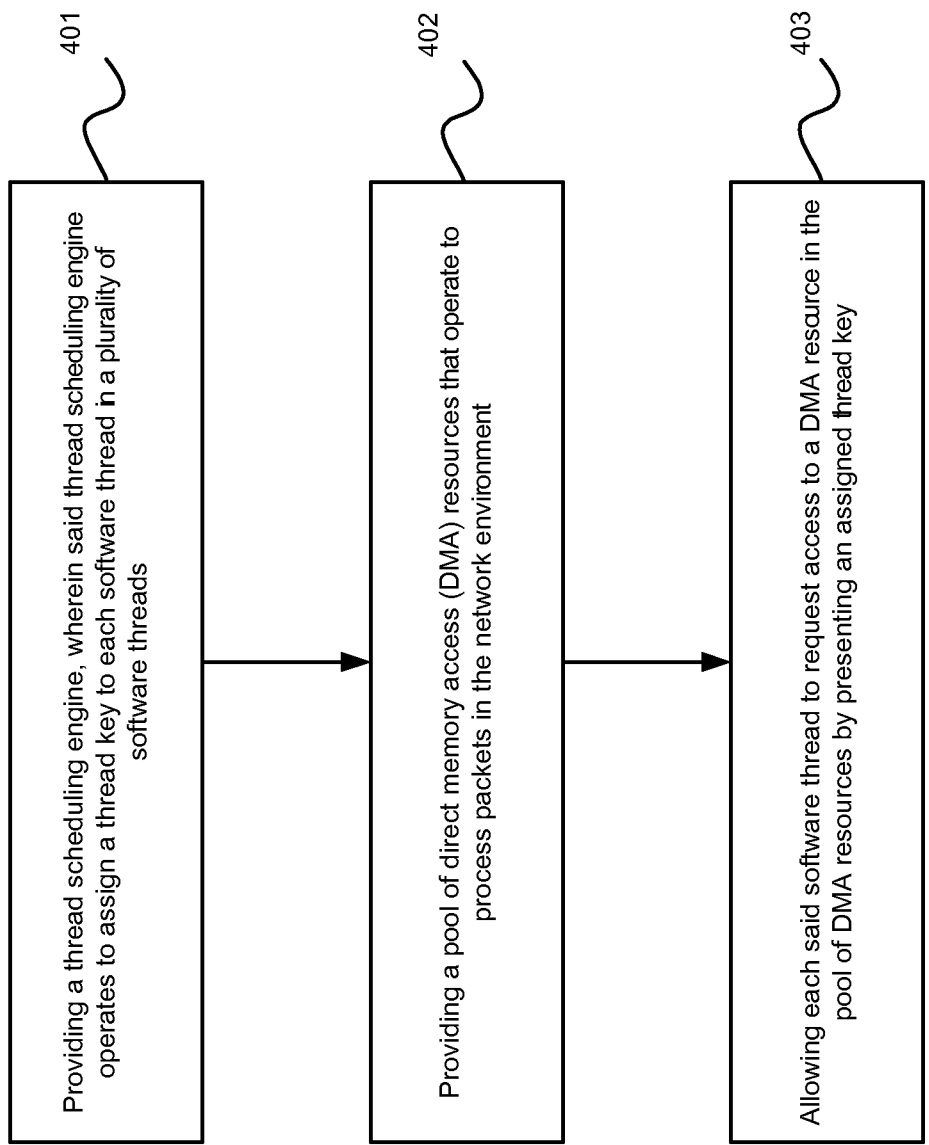
FIG. 4 illustrates an exemplary flow chart for supporting efficient packet processing in a network environment, in accordance with an embodiment of the invention.

FIG. 4 illustrates an exemplary flow chart for supporting efficient packet processing in a network environment, in accordance with an embodiment of the invention. As shown in FIG. 4, at step 401, the system can provide a thread scheduling engine, wherein said thread scheduling engine operates to assign a thread key to each software thread in a plurality of software threads. Furthermore, at step 402, the system can provide a pool of direct memory access (DMA) resources that operate to process packets in the network environment. Then, at step 403, each said software thread operates to request access to a DMA resource in the pool of DMA resources by presenting an assigned thread key.

Efficient Buffer Utilization for Packet Processing

Figure 5:
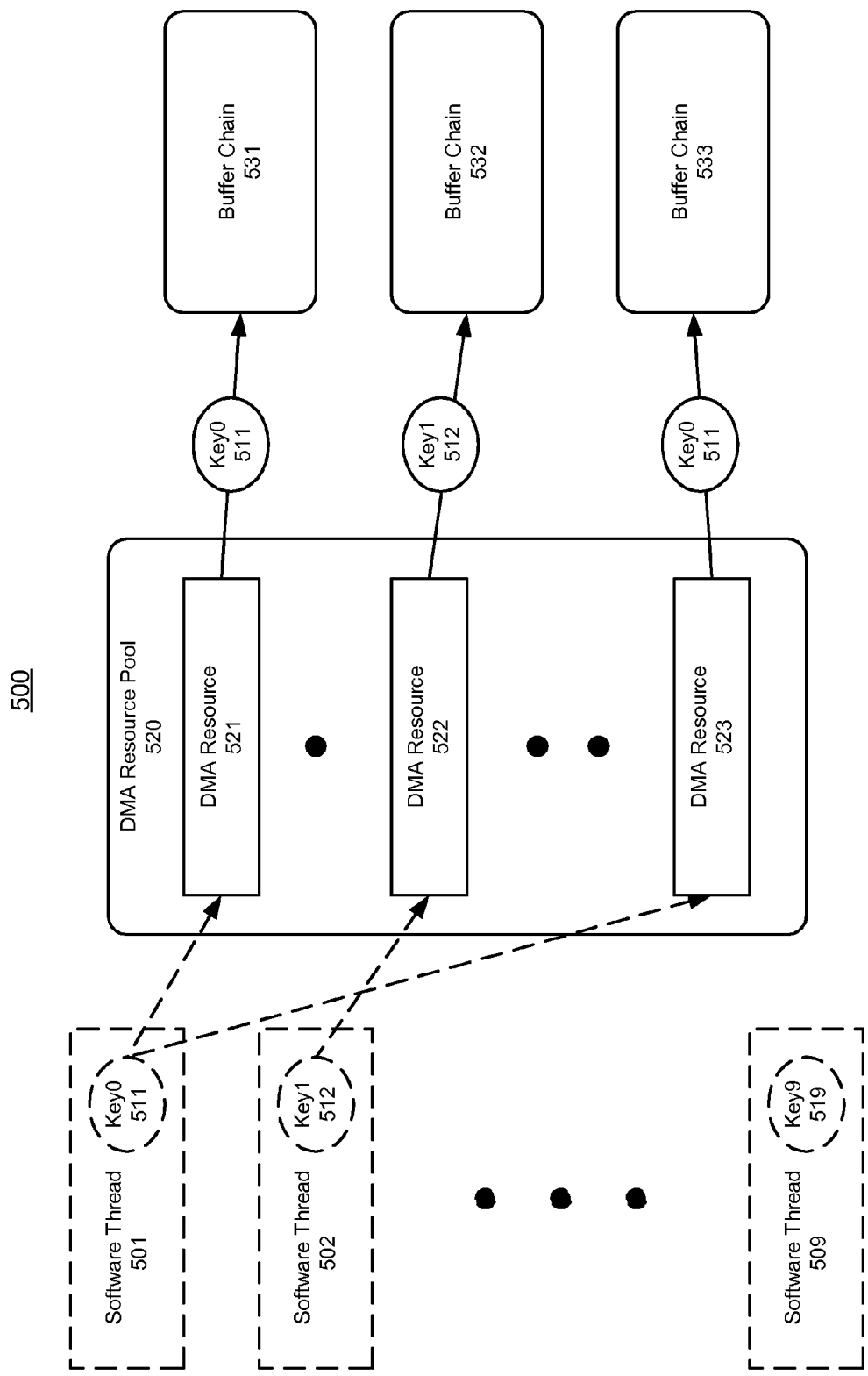
FIG. 5 shows an illustration of supporting efficient buffer utilization for packet processing in a networking device, in accordance with an embodiment of the invention.

FIG. 5 shows an illustration of supporting efficient buffer utilization for packet processing in a networking device, in accordance with an embodiment of the invention. As shown in FIG. 5, the DMA resources 521-523 in a DMA resource pool 520 can be associated with one or more buffer chains 531-533, each of which can contain various number of packet buffers in a networking device 500.

In accordance with an embodiment of the invention, when a DMA resource is initialized, the DMA resource can point to an empty container, which can be used for containing packet buffers. Furthermore, the buffer chains 531-533 in the memory, where various packet buffers are placed, can be in the form of either a linked list or a linear array. Unlike a fixed ring structure, the size of a buffer chain 531-533 can grow (subject to memory limits). Additionally, using the buffer chains 531-533, the system allows for multi-threaded access to the queuing structures.

As shown in FIG. 5, the software threads 501-509 can make a request for accessing the packet buffers in the buffer chains 531-533, by presenting the pre-assigned thread keys (such as key0 511 to key9 519). For example, the software thread 501 can access the packet buffers in the buffer chain 531, using a pre-assigned thread key, key0 501. Also, the software thread 502, can access the packet buffers in the buffer chain 532, using a pre-assigned thread key, key1 512.

Furthermore, if a packet processing software thread needs to process more than one set of buffer chains (e.g. in the case of scheduling a second set of packet processing queues before the first set of packet processing queues are done), the requesting software thread can obtain and use another DMA resource out of the same hardware DMA resource pool 520. As shown in FIG. 5, the software thread 501 can request to access the packet buffers in the buffer chain 533, using the same pre-assigned thread key, key0 501.

Additionally, if ordering is required among multiple packet processing processes, the system can set a resource dependency number as part of the configuration. The hardware processors can serialize the packet processing if the dependency list is set. Otherwise, the system may process the packets in an arbitrary manner.

Furthermore, if a particular task requires potentially parallel processing by hardware threads and also requires the results to be sent out in order, then the system can dispatch the tasks to the DMA engines that have the dependency attribute set. Thus, the system can pipeline the work and can make use of idle CPU time if it is available, in conjunction with allocating the DMA resources on demand.

In accordance with an embodiment of the invention, since each software thread 501-509 is pre-assigned with a thread key (such as key0 511 to key9 519), the system can set up multiple threads to concurrent access the packet buffers in the different buffer chains 531-533, without a need for implementing mutex locks or semaphores. This can be true for both sending and receiving packets from the network fabric. Also, the above scheme allows for packets to be pipelined in batches to the hardware either serially, or in parallel, when independent flows are being transmitted.

Figure 6:
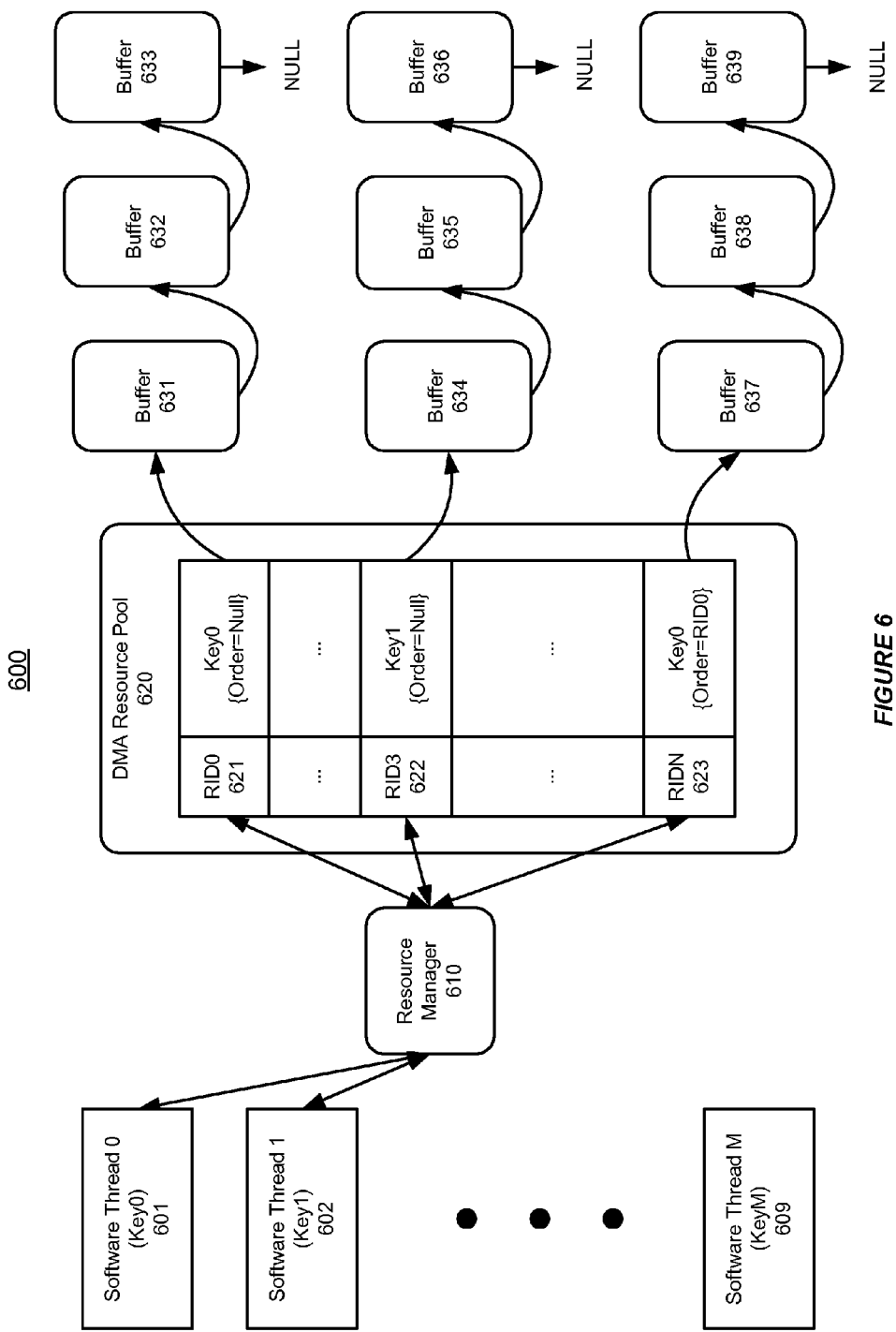
FIG. 6 shows an illustration of using buffer chains for packet processing in a networking device, in accordance with an embodiment of the invention.

FIG. 6 shows an illustration of using buffer chains for packet processing in a networking device, in accordance with an embodiment of the invention. As shown in FIG. 6, a resource manager 610 can be used to map a plurality of software threads 601-609 to different DMA resources in the free pool 620 in a networking device 600.

Each of the DMA resource in the free pool 620 can be associated with a resource ID, such as RID0 621, RID3 622, and RIDN 623. Furthermore, each DMA resource can maintain a thread key, which can be used to access the different buffer chains, and/or a thread ID, which can be used to assign and manage the different buffer chains.

For example, the software thread 0 601 (with a thread key key0 can present the thread key (key0) to the resource manager 610 in order to request for allocating a DMA resource. The resource manager 610, in turn, can provide the thread key (key0) to an available DMA resource, e.g. RID0 621. Furthermore, if the thread 601 needs more hardware resources, the resource manager 610 can provide the thread key (key0) to another available DMA resource, e.g. RIDN 623.

Then, the resource manager 610 can provide the status of the DMA resources and all related resource numbers (e.g. RID0 621 and RIDN 623) back to the software thread 601. Thus, the software thread 0 601 can have access to both chain of buffers 631-633 and 637-639, and can deallocate the related DMA resources after finishing packet processing.

Similarly, the software thread 1 602 (with a thread key key1) can present the thread key (key1) to the resource manager 610 in order to request for allocating a DMA resource. The resource manager 610, in turn, can provide the thread key key1 to an available DMA resource, e.g. RID1 622. Thus, the software thread 0 601 can have access to the chain of buffers 634-636.

Figure 7:
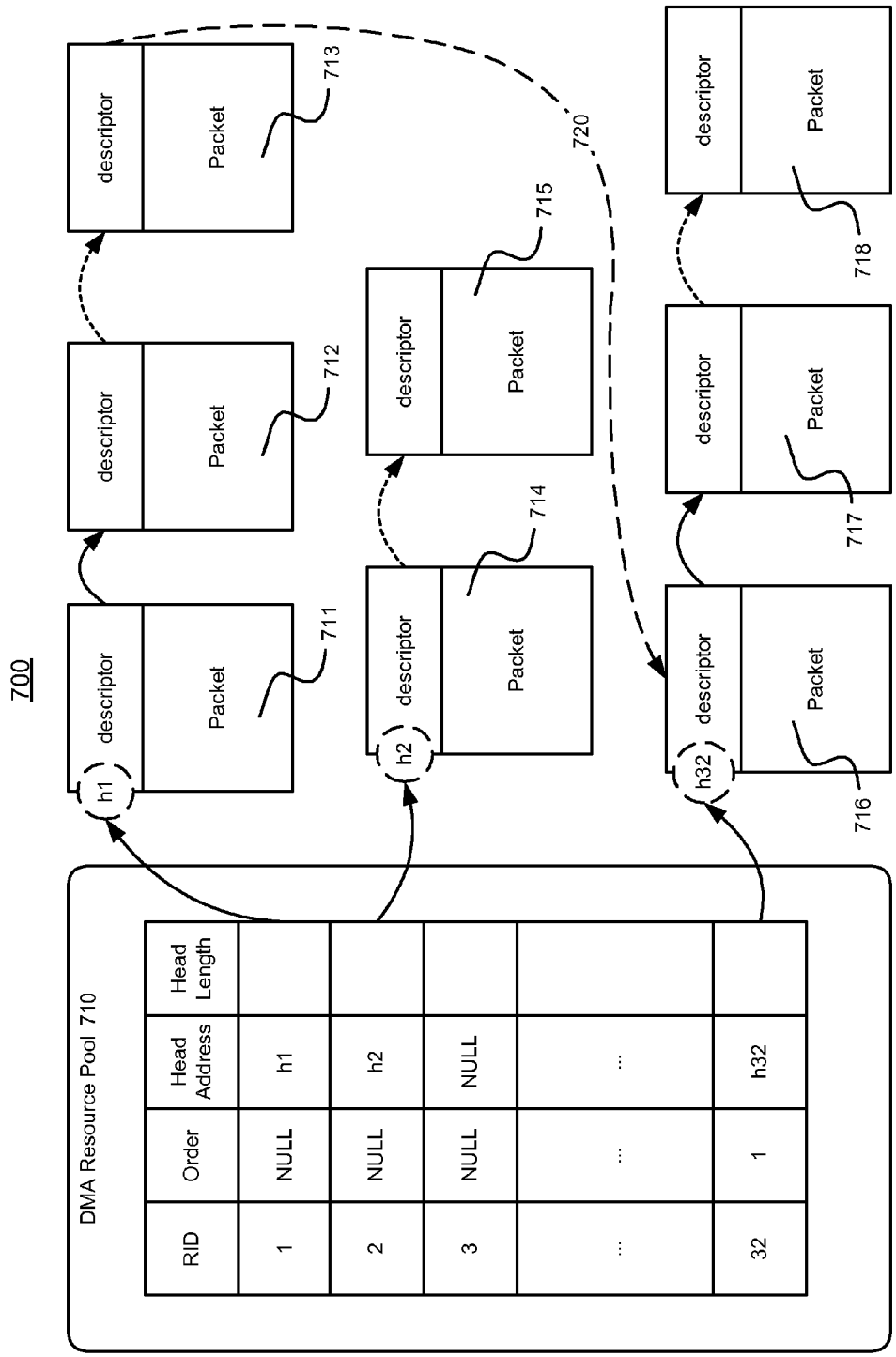
FIG. 7 shows an illustration of using one or more linked lists of buffers for packet processing in a networking device, in accordance with an embodiment of the invention.

FIG. 7 shows an illustration of using one or more linked lists of buffers for packet processing in a networking device, in accordance with an embodiment of the invention. As shown in FIG. 7, a free DMA resources pool 710 in a networking device 700 can maintain one or more DMA resources, each of which can be associated with several different properties, such as RID, Order, HeadAddr, and HeadLen. Here, the RID property can contain a resource number assigned to a buffer chain, and the Order property can indicate that a particular buffer chain is configured to be processed following another buffer chain.

As shown in FIG. 7, the system can use a linked-list data structure to implement a buffer chain for holding various packets. For example, the DMA resource with a resource number 1 can point to a linked list of packet buffers, which starts at the packet buffer 711 with a head address h1. Here, the packet buffer 711 is collocated with a descriptor. Within the linked list, the packet buffer 711 can point to the next packet buffer 712 and the packet buffer 712 can point to the next packet buffer 713, (each of the packet buffer 712 and the packet buffer 713 is also collocates with a descriptor).

Additionally, the DMA resource with a resource number 2 can point to a linked list of packet buffers, which starts at a packet buffer 714 with a head address h2. Here, the packet buffer 714 is collocated with a descriptor and can point to another packet buffer 715.

Furthermore, the software thread accessing the DMA resource with a resource number 1 may make a request for accessing additional hardware resources. For example, the software thread can access the DMA resource with a resource number 32, which points to linked list of packet buffers that starts at a packet buffer 716 with a head address h32. Similarly, packet buffer 716 is collocated with a descriptor and can point to other packet buffers 717 and 718 in the linked list.

Also as shown in FIG. 7, the system can force the hardware to process the packet buffers 711-713 before processing the packet buffers 716-718, by setting the Order value, for the DMA resource with a resource number 32, to 1 (as shown as an arrow 720 pointing from the packet buffer 713 to the packet buffer 716).

In accordance with an embodiment of the invention, using the scheme based on linked lists, the system can provide for a limited foot print in memory, which can be advantageous in the case of embedded systems. For example, the implementation of the linked list of packet buffers for the Linux environment can be straight forward, since the Linux implementation of packets is based on a linked list. Thus, the system can directly translate a linked list of packets in the Linux environment into a hardware linked list of packet buffers in the memory.

Furthermore, the implementation can be OS independent. For example, the system can be implemented on any general OS, custom OS, or embedded RTOS.

Figure 8:
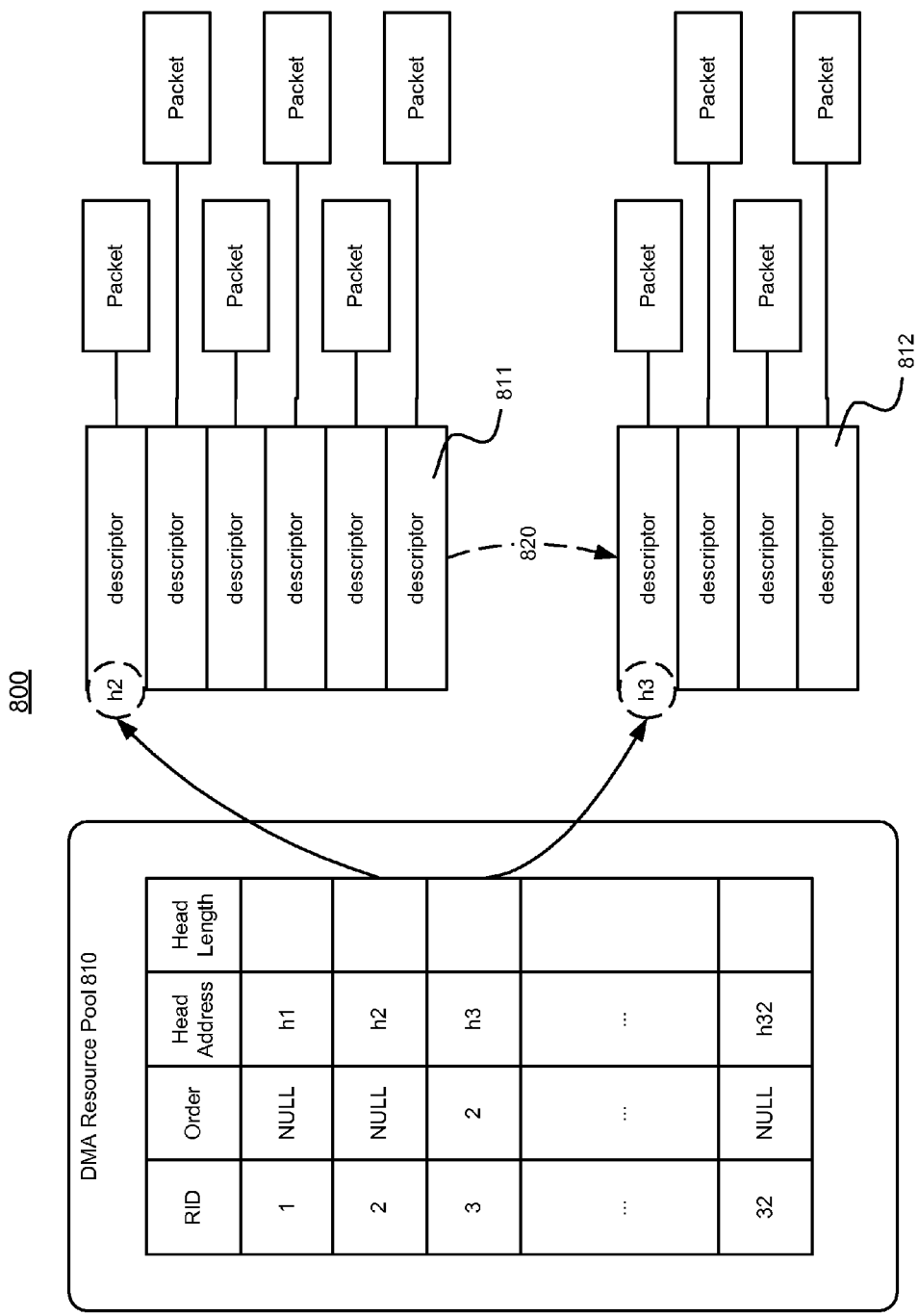
FIG. 8 shows an illustration of using one or more linear arrays for supporting packet processing in a networking device, in accordance with an embodiment of the invention.

FIG. 8 shows an illustration of using one or more linear arrays for supporting packet processing in a networking device, in accordance with an embodiment of the invention. As shown in FIG. 8, a free DMA resources pool 810 in a networking device 800 can maintain one or more DMA resources. Furthermore, each DMA resource can be associated with several different properties, such as RID, Order, HeadAddr, and HeadLen. Here, the RID property can contain a resource number assigned to a buffer chain, and the Order property can indicate that a particular buffer chain is configured to be processed following another buffer chain.

In accordance with an embodiment of the invention, the system can use a linear array of descriptors to implement a buffer chain for holding various packets. Furthermore, each descriptor in the linear array of descriptors can point to a separate packet buffer, and the system can reach each packet buffer from a different packet descriptor.

As shown in FIG. 8, the DMA resource with a resource number 1 can point to a linear array of descriptors 811 with a head address h2. Also, the DMA resource with a resource number 2 can point to a linear array of descriptors 812 with a head address h3. Here, the linear array of descriptors 811-812 is not collocated with the packet buffers.

Additionally, the system allows the packet buffers to be processed accordingly to a pre-configured order. For example, the system can set the Order value, for the DMA resource with resource number 3, to 2, in order to force the hardware engine to process the packet buffers associated with the linear array of descriptors 811 before the packet buffers associated with the linear array of descriptors 812 (as shown as an arrow 820 pointing from the linear array of descriptors 811 to the linear array of descriptors 812).

In accordance with an embodiment of the invention, the system can deal with multiple packets in one shot without a need to deal with each packet separately in a sequence. Thus, using the linear array of descriptors, the system can provide low latency, which can be advantageous, e.g. as a cache efficient scheme.

Figure 9:
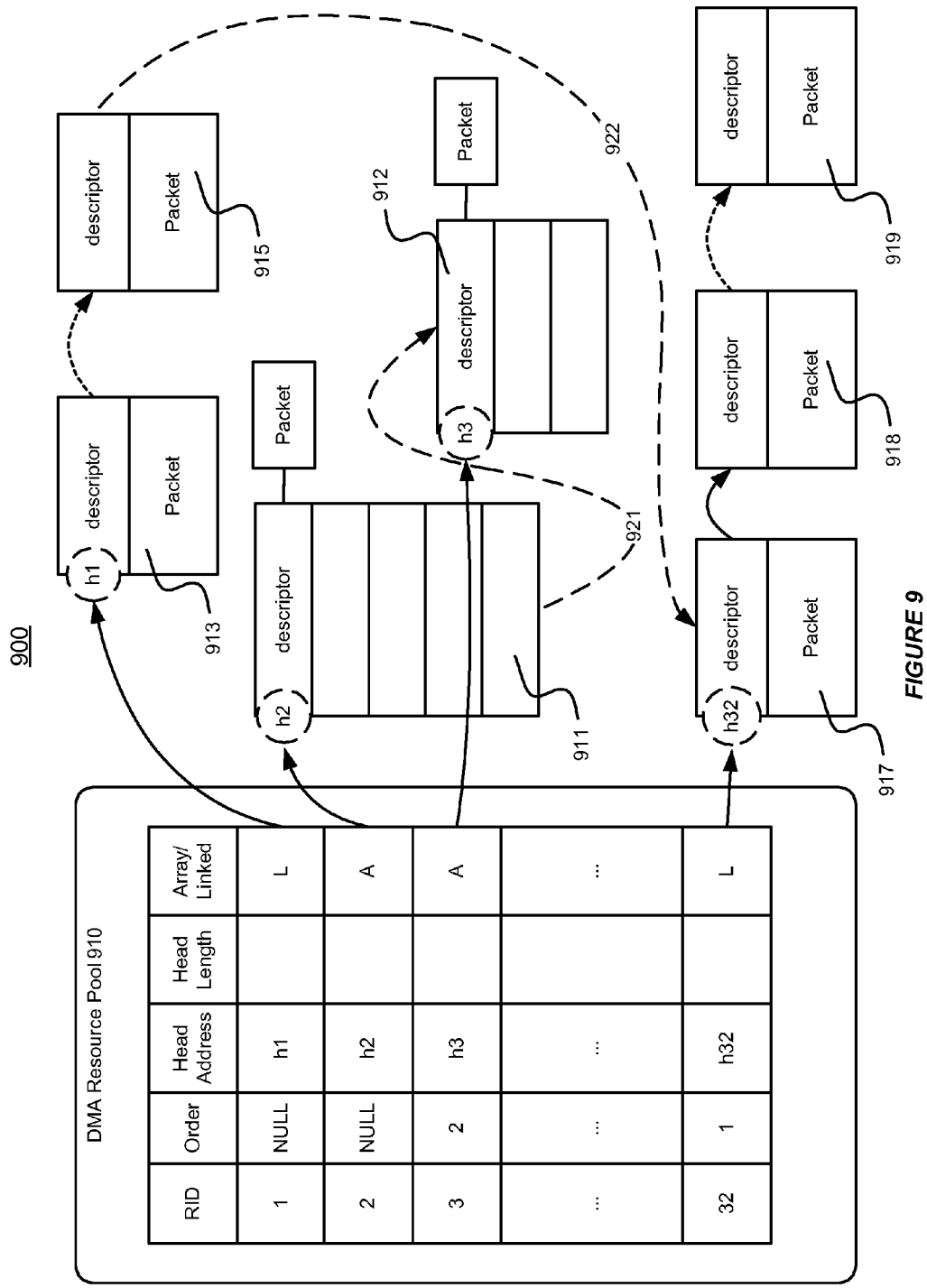
FIG. 9 shows an illustration of using a mix of linked lists and linear arrays to support flexible packet processing in a networking device, in accordance with an embodiment of the invention.

FIG. 9 shows an illustration of using a mix of linked lists and linear arrays to support flexible packet processing in a networking device, in accordance with an embodiment of the invention. As shown in FIG. 9, a free DMA resources pool 910 in a networking device 900 can maintain one or more DMA resources. Furthermore, each DMA resource can be associated with several different properties, such as RID, Order, HeadAddr, HeadLen, and Arrary/Linked. Here, the RID property can contain a resource number assigned to a buffer chain, and the Order property can indicate that a particular buffer chain is configured to be processed following another buffer chain.

In accordance with an embodiment of the invention, the different DMA resources in the free pool 910 can be associated with different types of buffer chains.

For example, the DMA resource with a resource number 2 can point to a linear array of descriptors 911 with a head address h2, each of which can point to a packet. Similarly, the DMA resource with a resource number 32 can point to a linear array of descriptors 912 with a head address h2, each of which can point to a packet.

Additionally, the DMA resource associated with a resource number 1 can point to a linked list of packet buffers, which start at the packet buffer 913 with head address h1. Within the linked list data structure, the packet buffer 913, which collocates with a descriptor, can point to another packet buffer 915. Similarly, the DMA resource associated with a resource number 32 can point to a linked list of packet buffers, which start at the packet buffer 917 with head address h32. Also, the packet buffer 917, which collocates with a descriptor, can point to other packet buffers 918 and 919 in the linked list data structure.

Furthermore, the system allows the packet buffers to be processed according to a pre-configured order (as shown as an arrow 921 pointed from the linear array of descriptors 911 to the linear array of descriptors 912, and an arrow 922 pointing from the packet buffer 915 to the packet buffer 917).

In accordance with an embodiment of the invention, the system can dynamically determine which type of buffer chain can be allocated for a requesting software thread. Such a determination can be based on the balance of memory usage and latency requirements of the particular packet processing thread. For example, if a particular packet processing thread is more sensitive to memory usage, then the system can allocate a linked list based buffer chain. Otherwise, the system can allocate a linear array based buffer chain, when the particular packet processing thread is more sensitive to latency.

Figure 10:
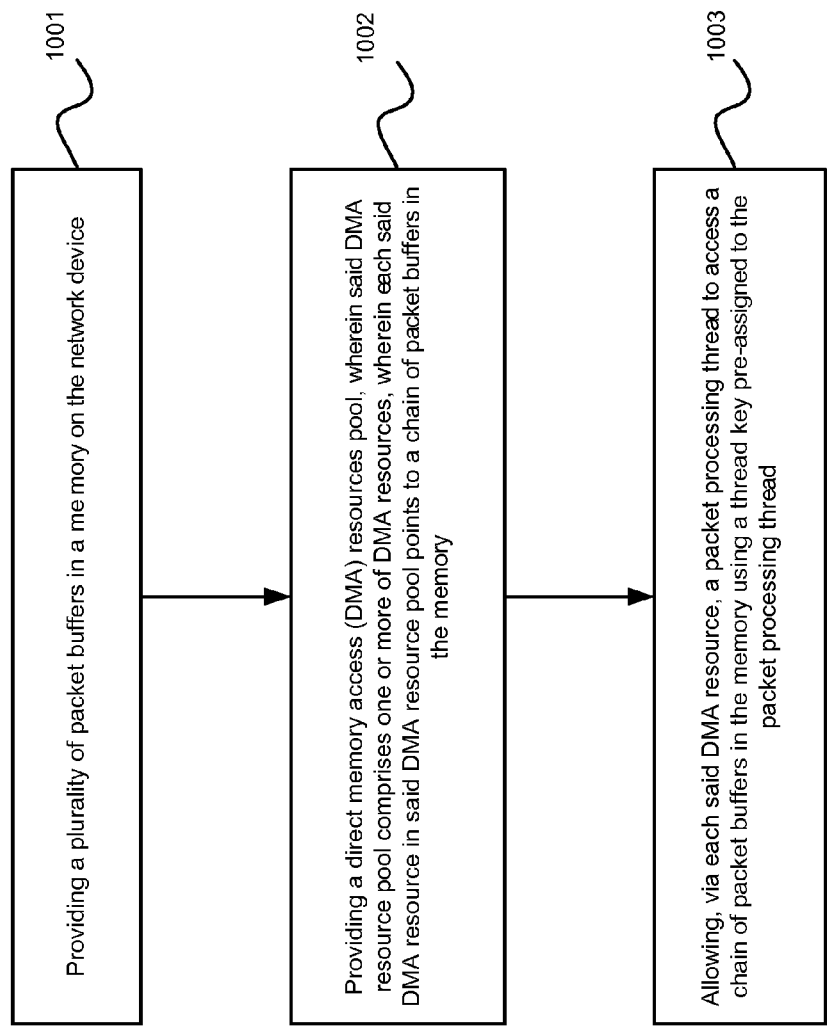
FIG. 10 illustrates an exemplary flow chart for supporting efficient buffer utilization for packet processing in a networking device, in accordance with an embodiment of the invention.

FIG. 10 illustrates an exemplary flow chart for supporting efficient buffer utilization for packet processing in a networking device, in accordance with an embodiment of the invention. As shown in FIG. 10, at step 1001, the system can provide a plurality of packet buffers in a memory on the network device. Furthermore, at step 1002, the system can provide a direct memory access (DMA) resources pool, wherein said DMA resource pool comprises one or more of DMA resources, wherein each said DMA resource in said DMA resource pool points to a chain of packet buffers in the memory. Then, at step 1003, each said DMA resource allows a packet processing thread to access a chain of packet buffers in the memory using a thread key pre-assigned to the packet processing thread.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting efficient packet processing in a network environment, the system comprising:
   a network device comprising a microprocessor and a memory;
   a plurality of packet buffers in the memory of the network device;
   a direct memory access (DMA) resource pool, wherein said DMA resource pool comprises one or more DMA resources, and wherein each said DMA resource in said DMA resource pool points to a chain of packet buffers in the memory;
   a thread scheduling engine operating on a network host machine that pre-assigns different thread keys to each of a plurality of software threads before each of the software threads requests access to the one or more DMA resources; and
   a resource manager, which allocates DMA resources for use by the software threads,
      wherein a requesting software thread from the plurality of software threads requests access to a DMA resource by presenting its pre-assigned thread key to the resource manager,
      wherein the resource manager maps an assigned DMA resource to the pre-assigned thread key associated with the requesting software thread; and
      wherein the assigned DMA resource enables the requesting software thread to access a particular chain of packet buffers in the memory using the thread key pre-assigned to that software thread.

2. The system according to claim 1, wherein:
said requesting software thread operates to access multiple chains of packet buffers in the memory using the pre-assigned thread key.

3. The system according to claim 2, wherein:
said requesting software thread operates to set a dependency list for processing packets in said multiple chains of packet buffers.

4. The system according to claim 1, wherein:
multiple requesting software threads operate to access different chains of packet buffers in the memory concurrently.

5. The system according to claim 1, wherein:
at least one DMA resource points to a linked list of packet buffers.

6. The system according to claim 5, wherein:
each packet buffer in the linked list collocates with a descriptor.

7. The system according to claim 1, wherein:
at least one DMA resource points to a linear array of descriptors.

8. The system according to claim 7, wherein:
each descriptor in a linear array of descriptors points to a packet buffer.

9. The system according to claim 1, wherein:
the plurality of packet buffers are organized based on a mix of linked lists and linear arrays.

10. The system according to claim 9, wherein:
said DMA pool operates to dynamically determine whether a software thread should access a chain of packet buffers based on a linked list or based on a linear array.

11. A method for supporting efficient packet processing in a network environment, comprising:
   providing a plurality of packet buffers in a memory on the network device;
   providing a direct memory access (DMA) pool, wherein said DMA resource pool comprises one or more DMA resources, and wherein each said DMA resource in said DMA resource pool points to a chain of packet buffers in the memory;

pre-assigning, by a thread scheduler operating on a network host machine, different thread keys to each of a plurality of software threads before each of the software threads requests access to the one or more DMA resources;

receiving at a resource manager, from a requesting software thread from the plurality of software threads, a request to access a DMA resource, by the requesting software thread presenting its pre-assigned thread key to the resource manager;

allocating, by the resource manager, a DMA resource from the one or more DMA resources to the requesting software thread, including mapping an assigned DMA resource to the pre-assigned thread key associated with the requesting software thread; and allowing, via its assigned DMA resource, the requesting software thread to access a particular chain of packet buffers in the memory using the thread key pre-assigned to that software thread.

12. The method according to claim 11, wherein:
said requesting software thread accesses multiple chains of packet buffers in the memory using the pre-assigned thread key.

13. The method according to claim 12 wherein:
said requesting software thread sets a dependency list for processing packets in said multiple chains of packet buffers.

14. The method according to claim 11, wherein:
multiple requesting software threads access different chains of packet buffers in the memory concurrently.

15. The method according to claim 11, wherein:
at least one DMA resource points to a linked list of packet buffers.

16. The method according to claim 15, wherein:
each packet buffer in the linked list collocates with a descriptor.

17. The method according to claim 11, wherein:
at least one DMA resource points to a linear array of descriptors.

18. The method according to claim 17, wherein:
each descriptor in the linear array of descriptors points to a packet buffer.

19. The method according to claim 11, further comprising:
organizing the plurality of packet buffers based on a mix of linked lists and linear arrays, and
dynamically determining whether a software thread should access a chain of buffers based on a linked list or based on a linear array.

20. A non-transitory machine readable storage medium having instructions stored thereon that when executed cause a system to perform the steps comprising:
providing a plurality of packet buffers in a memory on the network device;
providing a direct memory access (DMA) pool, wherein said DMA resource pool comprises one or more DMA resources, wherein each said DMA resource in said DMA resource pool points to a chain of packet buffers in the memory;
pre-assigning, by a thread scheduler operating on a network host machine, different thread keys to each of a plurality of software threads before each of the software threads requests access to the one or more DMA resources; and
receiving at a resource manager, from a requesting software thread from the plurality of software threads, a request to access a DMA resource, by the requesting software thread presenting its pre-assigned thread key to the resource manager;
allocating, by the resource manager, a DMA resource from the one or more DMA resources to the requesting software thread, including mapping an assigned DMA resource to the pre-assigned thread key associated with the requesting software thread; and
allowing, via its assigned DMA resource, the requesting software thread to access a particular chain of packet buffers in the memory using the thread key pre-assigned to that software thread.

* * * * *

UNITED STATES PATENT AND TRADEMARK OFFICE
CERTIFICATE OF CORRECTION

| | |
|---|---|
| PATENT NO. | : 9,858,241 B2 |
| APPLICATION NO. | : 14/072597 |
| DATED | : January 2, 2018 |
| INVENTOR(S) | : Srinivasan et al. |

Page 1 of 1

It is certified that error appears in the above-identified patent and that said Letters Patent is hereby corrected as shown below:

In the Specification

In Column 6, Line 12, delete "key0" and insert -- key0) --, therefor.

In Column 7, Line 66, delete "Arrary" and insert -- Array --, therefor.

Signed and Sealed this
Tenth Day of July, 2018

Andrei Iancu
*Director of the United States Patent and Trademark Office*